United States Patent [19]

Yamagishi

[11] 4,269,896

[45] May 26, 1981

[54] SURFACE PASSIVATED ALKALI HALIDE INFRARED WINDOWS

[75] Inventor: Frederick G. Yamagishi, Newbury Park, Calif.

[73] Assignee: Hughes Aircraft Company, Culver City, Calif.

[21] Appl. No.: 71,605

[22] Filed: Aug. 31, 1979

[51] Int. Cl.$^3$ ............................ B05D 3/06; B32B 9/04
[52] U.S. Cl. .................................. 428/411; 204/170;
350/1.6; 428/409; 428/696; 427/34; 427/38;
427/41; 427/168
[58] Field of Search ...................... 427/168, 34, 38, 41;
350/1.6; 204/170; 428/539, 411, 409

[56] References Cited

U.S. PATENT DOCUMENTS

| | | | |
|---|---|---|---|
| 3,518,108 | 6/1970 | Heiss | 204/170 |
| 3,822,928 | 7/1974 | Smolinsky | 427/38 |
| 3,940,506 | 2/1976 | Heinecke | 427/41 |
| 4,013,532 | 3/1977 | Cormia | 427/41 |
| 4,188,426 | 2/1980 | Auerbach | 427/41 |

OTHER PUBLICATIONS

"IR Laser Window Coating by Plasma Polymerized Hydrocarbons", J. M. Tibbitt, A. T. Bell, and M. Shen, Proc. Fifth Conference on Infrared Laser Window Materials, ed. by C. R. Andrews and C. L. Strecker, U.S. Air Force Materials Laboratory Special Report, Wright-Patterson AFB, Ohio (1976), p. 206.
"Characteristics of Plasmas Polymerized Ethane for Laser Window Costing" T. A. Reis, H. Hiratsuka, A. T. Bell, and M. Shen, Laser Induced Damage in Optical Materials: 1976, Jul. 13–15, 1976, Boulder Colo., NBS Special Pub. 462 (U.S. Government Printing Office, Washington, D.C., Dec. 1976), p. 230.

Primary Examiner—Ellis P. Robinson
Attorney, Agent, or Firm—Booker T. Hogan, Jr.; W. H. MacAllister

[57] ABSTRACT

Commercially available alkali halide crystals are passivated in a plasma environment and coated by a plasma polymerization process to form moisture resistant alkali halide cyrstals. Prolonged exposure to high humidity did not cause observable damage to the surface of the crystal.

20 Claims, 5 Drawing Figures

SURFACE PASSIVATED ALKALI HALIDE INFRARED WINDOWS

TECHNICAL FIELD

This invention relates generally to the field of infrared detector systems. More specifically the invention relates to the preparation of optical components for use in infrared detector systems. In particular, the invention relates to the preparation of lenses from alkali halide crystals which are suitable for use as optical components in infrared detector systems.

BACKGROUND ART

Alkali halides are attractive materials for use as windows and optical elements in IR detector and laser systems, particularly because of their high transmissivity in the far-IR (8- to 12-micro meter ($\mu$m) region). These compounds, however, are fragile and are sensitive to moisture. Exposing polished surfaces of these halides to high humidity causes the optical qualities of the window to deteriorate rapidly, ultimately degrading the entire system in which they are employed. The short lifetimes of alkali halides under humid conditions require that moisture-damaged elements be regularly replaced. Aside from the inconvenience and the diminished military reliability caused by the above conditions, the need to constantly replace these elements would greatly increase the cost of these systems. Consequently, there is a need for a moisture-protective coating that would extend the lifetime of alkali halide optical components in uncontrolled environments. Although alkali halide elements may be used in enclosed systems under partially controlled environments, protective coatings are of particular importance when the systems are opened to uncontrolled (i.e., high humidity) conditions during maintenance operations.

A protective coating, when applied to elements used in certain types of far-IR detector systems, must meet the following conditions:
(1) Low absorption (less than 5%) in the 8- to 12 $\mu$m region
(2) Low water permeability
(3) Insolubility in water and other solvents
(4) Hydrophobicity, low surface energy, low wettability
(5) Good adhesion and mechanical strength
(6) Temperature stability over a wide range of temperatures Previous attempts to prepare moisture-protective coatings for alkali halide windows have met with only partial success. Young (P. A. Young, Thin Solid Films 6, 423 (1970) showed that vacuum-evaporated $As_2S_3$, which was deposited as a vitreous film, protected NaCl for 7.5 hr at 100% relative humidity (RH). The degree of protection increased as the thickness increased. Films of $BaF_2$ and $MgF_2$ did not prevent damage because the growth occurred through the coalescing of crystallites, which promoted porosity through voids. Damage to the surface always occurred at scratches on the underlying surface caused by mechanical polishing. Similar results were obtained by Hopkins et al. (R. H. Hopkins, R. A. Hoffman, and W. E. Kramer, Appl. Opt. 14, 2631 (1975)) who thermally evaporated $CaF_2$ on mechanically polished NaCl. This afforded protection for 24 hr at 95% RH (27° to 50° C.), after which the film failed by localized moisture penetration along fine cracks in the film.

Organic polymers would appear to be excellent candidates for moisture-protective coatings for halide infrared windows. However, there are problems to be overcome in order to realize the full potential of these materials. For example, several polymers are known to be hydrophobic, but many contain functional groups that absorb in the far-IR. Linear hydrocarbon polymers, such as polyethylene, have second order absorption in the far-IR that precludes their being used. Also, thin polymer films are known to be porous. Hopkins et al, (supra) sputter deposited both polytetrafluroethylene and fluorinated polyethylenepropylene onto NaCl. These films protected the window from moisture damage in 95% RH for ~72 hr before moisture permeated the film, dissolving the underlying surface.

Many of the problems discussed above can be minimized or alleviated by depositing the polymer in a glow discharge. This process is also called plasma polymerization (M. Millard, in *Techniques and Applications of Plasma Chemistry*, ed. J. R. Hollahan and A. T. Bell, John Wiley and Sons, New York, N. Y., 1974, Chapter 5). The first example of the utility of plasma-polymerized films as moisture barriers for alkali halides was reported by Hollahan, Wydeven, and Johnson. (J. R. Hollahan, T. Wydeven, and C. C. Johnson, Appl. Opt. 13, 1844 (1974). Films prepared from the monomers chlorotrifluoroethylene and tetrafluoroethylene (TFE) were deposited on CsI and NaCl, respectively, in a bell jar glow discharge reactor. Plasma-polymerized TFE protected NaCl from damage by 88.8% RH for 117 hr, at which time the testing was arbitrarily stopped. These films cannot be used in the far-IR since the C-F bonds absorb strongly at ~8 $\mu$m.

The closest prior art, known by applicant, disclosed by of Tibbitt, Bell and Shen (J. M. Tibbitt, A. T. Bell, and M. Shen, Proc. Fifth Conference on Infrared Laser Window Materials, ed. by C. R. Andrews and C. L. Strecker, U. S. Air Force Materials Laboratory Special Report, Wright-Patterson AFB, Ohio (1976), p. 206) where it is reported that plasma-polymerized ethane (PPE) showed ~0.1 as much absorptance in the 8- to 12-$\mu$m region as did polyethylene prepared by free-radical polymerization. The PPE film showed none of the absorption bands characteristic of carbon-carbon double bonds, and there was no change in the IR spectrum after a coated NaCl window was allowed to stand in air for 30 days. Dielectric loss factor measurements of the PPE coated NaCl window suggested that there was a very low uptake of water into the polymer matrix when the film was exposed to high humidity. The PPE polymer was found to be insoluble in organic solvents, stable in acid and base, and did not degrade when heated to 300° C. (Polyethylene melts at 115° to 135° C.) (F. W. Billmeyer, Jr., *Textbook of Polymer Science*, Interscience, New York, N.Y., 1962, Chapter 13) depending on the density). However, it has been the experience of Applicant herein that alkali halide crystals coated with PPE film, in a manner similar to that taught by Shen et al (supra), developed moisture bubbles below the surface of the polymer coatings when exposed to high humidity environments for a prolonged period of time.

SUMMARY OF THE INVENTION

A general purpose of this invention is to provide optical components fabricated from alkali halide crystals which resist degradation when exposed to high humidity environments.

While achieving the above stated purpose and at the same time avoiding the disadvantages of the prior art while retaining most if not all of advantages of the above described prior art, it has been discovered that high-humidity-resistant optical components with excellent transmissivity to 8–12 μm light are obtained by applying a plasma-polymerized short chain saturated hydrocarbon film to the passivated surface of an alkali halide crystal in a continuous in situ passivation and polymerization process.

Accordingly, it is an objective of this invention to provide optical components which transmit light in the 8 to 12 μm range and which do not degrade when exposed to a high humidity environment.

An additional objective of this invention is to provide coatings for alkali halide crystals which protect said crystals from damage otherwise occasioned upon exposure of the crystal to a high humidity environment.

An additional objective of this invention is to provide a process for applying moisture resistant coatings to alkali halide crystals.

That I obtain these objectives and others will become readily apparent in the following detailed description of the invention.

DETAILED DESCRIPTION OF THE INVENTION

It has been discovered that saturated carbon-hydrogen films, when applied in situ to preconditioned and passivated surfaces of alkali halide crystals, render said crystals essentially moisture insensitive and thereby suitable for use as optical elements in various optical devices. Crystals prepared in accordance with this invention are excellent transmitters of light in the far infrared (IR) wavelengths (8–12 μm) and withstand 100% RH environments for extended periods of time without any apparent signs of degradation.

The process of this invention is suitable for applying protective coating to sodium chloride, sodium bromide, sodium iodide, sodium fluoride, potassium chloride, potassium bromide, potassium fluoride, potassium iodide, rubidium chloride, rubidium bromide, rubidium iodide, rubidium fluoride, cesium chloride, cesium bromide, cesium iodide, and cesium fluoride crystals.

It has been found that saturated carbon and hydrogen films prepared from gaseous alkane monomers are best suited for optical coatings, particularly if the device is intended for use in the far IR ranges. Gaseous alkane monomers suited for the in situ preparation of protective films include, but are not limited to, methane, ethane, propane, butane, and pentane. These materials are suitable for plasma polymerization to form high quality, reproducible films that are essentially impermeable to water and serve as excellent protective coatings.

The term plasma polymerization as used herein generally describes the use of several types of electrical discharge configurations in which molecules (from gaseous monomers) are subject to energetic electrons in the discharge or plasma. This results in the formation of intermediate free radicals, ions, and other high energy species derived from the monomer. The interaction of these species ultimately leads to polymerization. Although the detailed mechanism for the formation of plasma polymerized films is not completely understood, it is generally believed that the initial step is the absorption of the monomer on the substrate surface. This monomer layer is then bombarded by reactive plasma species as well as being acted upon by photochemical energy produced in the plasma. There is little discrimination shown in the position of formation for the free radicals. The net result of the propagating step is both a continuous growth of the polymer chains and a developing matrix of crosslink sites.

The novel process embodying this invention can best be understood upon reference to the figures where a sequential flow diagram describing the various steps of the process is shown and schematic representations of alkali halide crystal surfaces are shown.

Figure 1:
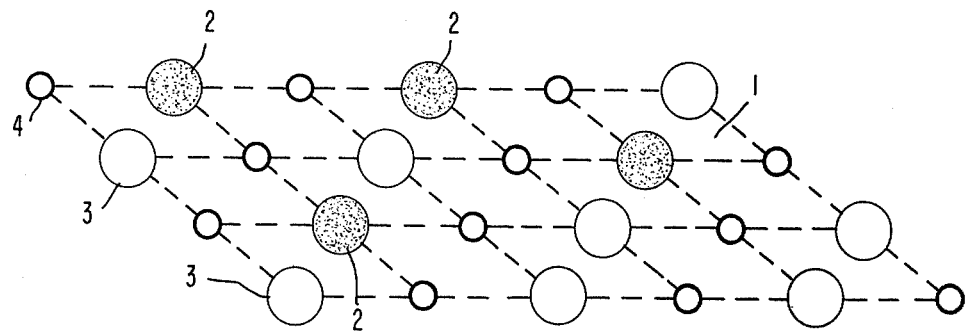
FIG. 1 is a schematic representation of the surface of a commercially available alkali halide crystal.
Figure 2:
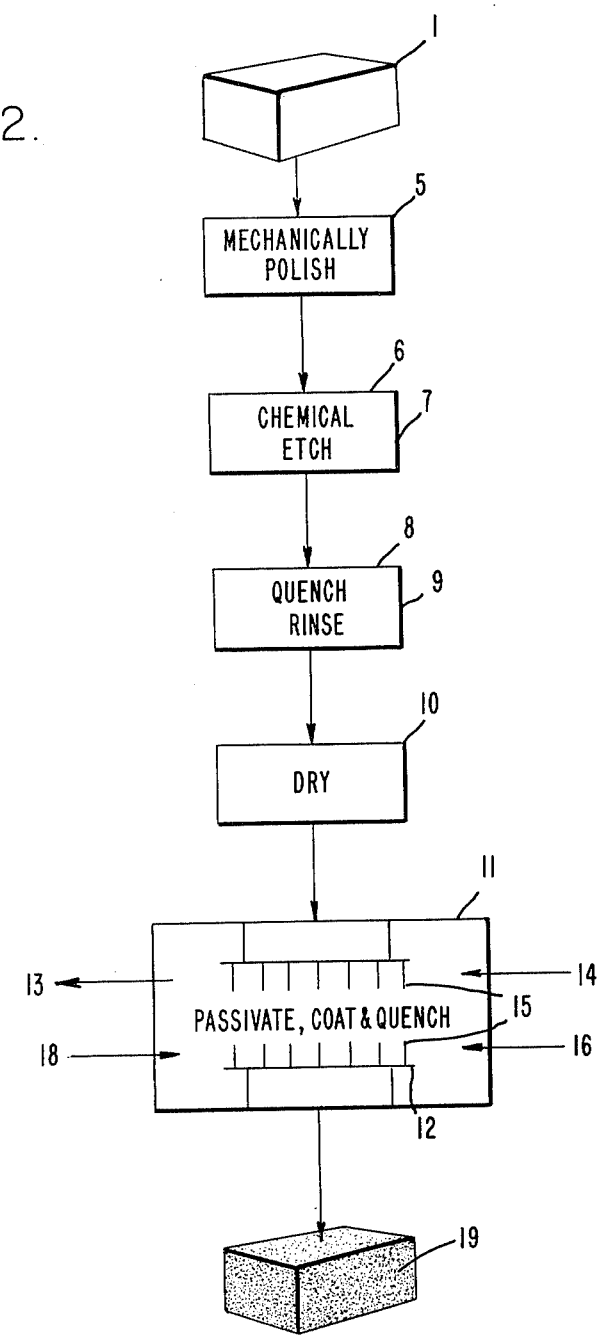
FIG. 2 presents schematically the process utilized to cause alkali halide crystals to be passivated and coated.

Refering to the figures, a commercially available alkali halide crystal 1 (FIG. 1) having hydroxyl anions 2, halogen anions 3, and alkali cations 4 on its surface is first subjected to a conventional mechanical polishing action 5 (FIG. 2) to remove structural defects on the surface of the crystal.

Figure 3:
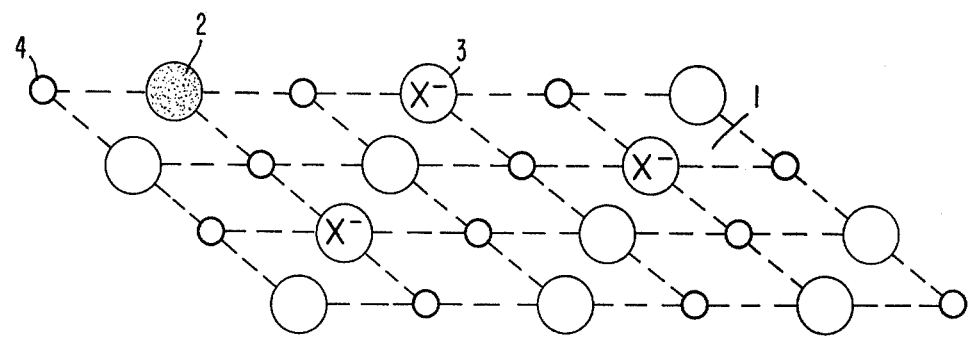
FIG. 3 is a schematic representation of the surface of a partially passivated alkali halide crystal.

The polished crystal is then placed in a bath 6 and partially passivated by a chemical etch process utilizing an aqueous acid medium 7. This step causes hydroxyl anions 2 to be partially replaced with halogen anions 3 from the etch medium. (See FIG. 3). However, the crystal surface still contains some undesirable hydroxyl anion 2 contaminants.

The partially passivated crystal is removed from the acid medium 7 and placed into a quench and rinse zone 8 through which an alcohol 9, whose formula is $C_nH_{2n+1}OH$ where $1<n<5$, flows to neutralize the etching action of the acid.

After neutralization, the crystal 1 is then removed to a drying zone 10 where the alcohol 9 is removed by the impinging action of hot air directed from a desicated blower (not shown) and placed in a reactor 11, adapted for providing controlled environments which alternatively serve to completely passivate the surface of the crystal and to cause polymeric films to be formed in situ on the passivated surfaces.

A typical plasma reactor 11 suitable for this purpose is the bell jar reactor built by the Tegal Corporation, (Model PR-100), which is a capacitively coupled parallel plate reactor using 5.5 × 11 inch aluminum electrodes 12 separated by 1 inch.

The reactor is evacuated, through line 13 connected to a means such as a vacuum pump for reducing the pressure within said reactor 11 to at least 0.01 Torr and controlably maintaining said pressure. A selected gaseous reactant 14, such as dichlorodiflouromethane, is introduced into the reactor 11 at flow rates between 5 and 100 cc/min at operating pressures of from 0.1 to 5.0 Torr.

Figure 4:
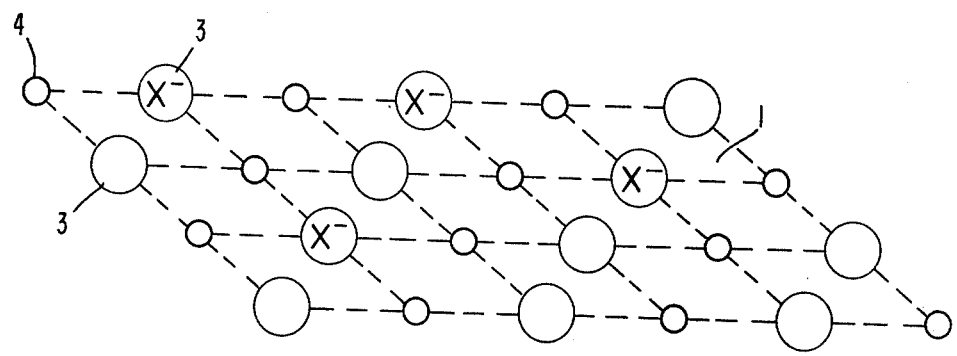
FIG. 4 is a schematic representation of the surface of a totally passivated alkali halide crystal.

A plasma 15 is initiated at 100 watts using an RF generator (not shown), such as Model 300P sold by the Tegal Corp., operating at 13.56 MHz while simultaneously balancing the load of the plasma to the generator though an impedance matching network (not shown). This plasma 15 causes nacent halogen atoms and anions 15 to be generated from the gaseous reactant 14 which impinge upon the surface of the partially passivated alkali halide crystal 1 and displace residual hydroxyl anions 2 found thereon to achieve total passivation of the crystal surface. A schematic representation of a totally passivated crystal surface is shown in FIG. 4.

In order to preclude recontamination of the surface and to facilitate the in situ formation of a protective coating on the surface of the crystal, the reactor is then evacuated and back filled with a gaseous alkane monomer 16.

Figure 5:
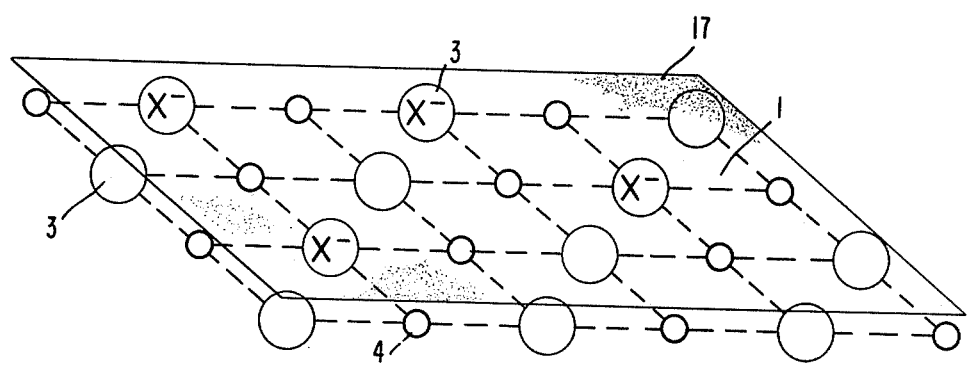
FIG. 5 is a schematic representation of an alkali halide crystal having an amorphous film applied to a passivated surface; thereof.

A second plasma environment is then created which differs from the first plasma environment in its intensity and mode of operation. The second plasma environment is a variable phase plasma comprised of a pulse mode operation and a continuous mode operation at a 200 watt level. The pulse mode operation is maintained for from 30 to 45 min for the purpose of dislodging and removing any traces of the gaseous reactant utilized to passivate the surface of the crystal. The continuous mode operation causes the alkane monomer to polymerize in situ thereby forming a film 17 (FIG. 5), which deposits onto and coats the passivated surface of the crystal. This phase of the process generally requires from 5 to 15 hours. There is no exposure of the passivated crystal to an uncontrolled environment prior to the deposit of the plasma polymerized film on its surface.

When the coating phase of the process is completed, the plasma is terminated and ethylene gas 18 is introduced into the reactor. Unreacted alkane monomer molecules are displaced and residual free radicals are quenched by the ethylene purge prior to exposure of the coated crystal 19 (FIG. 5) to air.

The results obtained via this process may be altered by varying the process step parameters. For example: Partial passivation is achieved when an alkali halide crystal is immersed into an aqueous hydrochloric acid solution having from 50 to 75% HCl by volume. The immersion time may range from 15 to 300 sec.; the action of the acid medium on the crystal surface is terminated by rinsing the crystal in an alcohol whose formula is $C_nH_{2n+1}OH$ where $1 < n < 4$; other reactant gases such as $CF_4$ (Freon 14) $CCL_4$ (carbon tetrachloride) and $CClF_3$ may be used as passivating agents; and the thickness and physical nature of the film formed in situ may be change by varying the pressure within the reactor and the flow rate of the alkane monomer gases.

Alkane monomers are prefered because polymerized films of the monomers do not interfere with the light transmission characteristics of the uncoated crystals in the far IR region. However, other gaseous monomers may be utilized where the intended use of the crystal, when coated, permits a variation in its transmission characteristics.

While the concept of applying protective coatings to alkali halide crystals is not new, as discussed above, I have discovered a process for applying certain coatings to the surface of alkali halide crystals which results in a novel film-coated crystal structure that exhibits superior moisture resistant and light transmission characteristics. Basically, it has been discovered that optical elements prepared from alkali halide crystals coated by prior art processes sometimes fail because the coatings are applied to an unpassivated alkali halide surface, i.e., the surfaces of the alkali halide crystals are comprised of alkali cations, halogen anions, and hydroxyl anions. It is the presence of the hydroxyl anions of the surface of the crystals, prior to the application of the protective coating, which provides the impetus for the deterioration of the crystals by drawing water molecules from a moisture rich environment through the protective coating thereby forming a water layer beneath the coating. This water layer hydrates the hydroxyl anions and ultimately attacks the crystal structure.

As a result of numerous attempts to apply protective coatings to alkali halide crystals having little or no hydroxyl anion ($OH^-$) contamination, the process described above and claimed below for removing $OH^-$ contamination and subsequently applying a protective coating which transmits light in the desired wavelength ranges was discovered. This process results in a alkali halide crystal coated with a transparent protective film where the crystal surface-film surface interface is void of undesirable $OH^-$ contaminates.

Prior art processes for applying coatings to alkali halide crystals failed to yield film-coated crystals having the structure of this invention because of the inherent hydroscopic character of alkali halide crystals which causes $OH^-$ to be reformed on the surface of the targe crystals prior to the coating process. The inventions described above and claimed below avoids the disadvantage of the prior art process by passivating the surface of the crystal and subsequently causing a filmcoating to be applied in situ to the passivated surface.

The effectiveness of a plasma polymerized alkane film as a moisture barrier for alkali halide windows is directly related to the surface free energy and to the surface topography. The purpose of this invention is to completely remove hydrophilic species from a topologically smooth surface in order to lower the surface free energy. Thus, the potential energy difference between the substrate polymer interface is reduced by this invention to the extent where water absorbed on the surface of the protective alkane film need not be drawn through the film in order to minimize the energy difference at the interface.

Previously, passivation of the surface of alkali halide windows was accomplished by a chemical etch using hydrochloric acid. This is an effective method for removing surface damage caused by mechanical polishing, but it is not completely effective in minimizing the surface free energy. The combination of a chemical etch with the passivation method outlined above in this invention offers greater advantages for lowering the surface energy than a chemical etch alone. Implementation of this invention led to increased moisture protection for sodium chloride (NaCl) by a factor of 12 over a film deposited on a chemically etched surface. Furthermore, the increased protection was obtained with a film thickness decreased by a factor of three.

A specific example of the passivation procedure is shown below:

EXAMPLE 1

A sodium chloride sample was obtained (Harshaw Chemical Co., 38.5 mm×19.5 mm×4 mm) as an unpolished window. It was mechanically polished to a surface roughness of less than 1 $\mu$m and chemically etched with hydrochloric acid (conc. HCL/H$_2$O, 2/1) for two minutes, rinsed with electronic grade 2-propanol, and dried with a stream of warm air. The sample was placed in a bell jar reactor and the system was evacuated to a pressure of 0.07 Torr. The system was then flushed with dichlorodifluromethane (Freon 12, Matheson Gas Products) at a flow of approximately of 100 cc per minute for 10 minutes after which the flow was adjusted to ≃12 ml/min. The plasma was initiated at 100 watts (continuous mode) at a pressure of 0.28 Torr and was continued for a total of 5 minutes. The gas flow was shut off, the discharge terminated, and the system was evacuated. This procedure caused the surface crystals to become completely passivated.

Having passivated the crystal as shown above in Example I without exposing the crystal to the ambient atmosphere, it is then possible to continue with the in situ polymerization of an alkane monomer to form a plasma polymerized alkane film. A specific example of the continuation of this process is shown below in Example 2.

EXAMPLE 2

Plasma-polymerized ethane was deposited on the sodium chloride crystal passivated in Example 1, under the following conditions which were found to yield high quality films in this reactor: Initial pressure = 0.07 Torr, flow rate of ethane (Matheson Gas Products, cp grade) = 10 cc per minute at standard temperature and pressure (STP), reaction pressure = 1 Torr, and power = 200 watts (continuous mode). After six hours, the reaction was stopped giving a pale yellow film, 2.5-3.0 $\mu$m thick. The sample was stored under 12 Torr of ethylene before exposing it to air.

EXAMPLE 3

An optical element having a plasma polymerized ethane film prepared in accordance with Example 2 applied to a crystal passivated in accordance with Example 1 was tested as follows: The window was removed from the ethylene storage and placed in a hermatically sealed holder that allowed a ½" diameter portion of the coated window to be exposed. This assembly was placed in a sealed chamber which contained a saturated solution of cupric sulfate pentahydrate (98% relative humidity at 20° Centigrade). The sample was removed after 97 hrs. Although there were some small striations in the film, there were no bubbles or cracks in the film and there were no visible signs of surface degredation due to water dissolution.

INDUSTRIAL APPLICABILITY

Optical components such as windows, lenses or elements, may be fabricated from alkali halide crystals overcoated in accordance with this invention. Such compenents are useful in infrared sensing and detecting devices which operate in uncontrolled ambient environments for extended time periods.

Having disclosed my invention and provided teachings which enable others to make and utilize the same, the scope of my claims may now be understood as follows.

What is claimed is:

1. A moisture resistant alkali halide crystal optical element comprising a crystal substrate having passivated hydroxyl ion free outer surfaces, defined exclusively by alkali cations and halogen anions maintained in a spatial relationship with respect to each other by electrostatic bonds, coated with a thin amorphous saturated film of polymerized carbon and hydrogen atoms.

2. An optical element of claim 1 wherein said film consists of plasma polymerized alkane molecules.

3. An optical element of claim 2 wherein said alkane molecules are selected from the group consisting of methane, ethane, propane, butane and pentane and said crystal is selected from the group consisting of sodium chloride, sodium bromide, sodium iodide, sodium fluoride, potassium chloride, potassium bromide, potassium iodide, potassium fluoride, rubidium chloride, rubidium iodide, rubidium bromide, rubidium fluoride, cesium chloride, cesium bromide, cesium iodide and cesium fluoride.

4. The optical element of claim 3 wherein said alkane molecules are ethane molecules.

5. An optical element of claim 1 wherein said crystal is a sodium chloride crystal, said alkali cations are sodium cations and said halogen anions are chloride anions.

6. An optical element of claim 5 wherein said film is a plasma-polymerized ethane film.

7. A polymer coated alkali halide window prepared by the process of passivating the surface of a commercially available alkali halide crystal by exposing said surface to nascent halogens in a controlled plasma environment and subsequently plasma polymerizing an alkane under conditions which causes said plasma polymerized alkane to deposit onto said passivated surface of said crystals thereby forming a plasma polymerized alkane overcoated alkali halide window.

8. A window prepared by the process of claim 7 wherein said alkali halide is selected from the group consisting of sodium chloride, sodium bromide, sodium iodide, sodium fluoride, potassium chloride potassium bromide, potassium iodide, potassium fluoride, rubidium chloride, rubidium bromide, rubidium iodide, rubidium fluoride, cesium chloride, cesium bromide, cesium iodide, and cesium fluoride.

9. An alkali halide window of claim 7 wherein said alkane is selected from the group consisting of methane, ethane, propane, butane, and pentane.

10. A window in accordance with claim 7 wherein said halide is sodium chloride and said alkane is ethane.

11. A window prepared by the process of claim 7 wherein the surface of said halide is passivated by causing it to be exposed to a plasma environment containing a chlorofluorocarbon gas at a reduced pressure.

12. A process for forming moisture resistant optical elements from alkali halide crystals comprising the steps of:
 (a) first polishing the surfaces of a commercially available alkali halide crystal and subsequently etching said surfaces by exposing said surfaces to an aqueous acid medium;
 (b) passivating said etched surfaces by passing a chlorofluocarbon gas over said surfaces in the presence of a first plasma environment; and
 (c) causing a saturated film of carbon and hydrogen atoms to be formed in situ on said passivated surfaces by creating a second plasma environment about said surfaces and passing a gaseous alkane into said second plasma environment which causes said alkane to polymerize and deposit onto said surface thereby forming a moisture resistant film coated alkali halide crystal that is suitable for use as an optical element.

13. The process of claim 12 wherein said acid medium is an aqueous hydrochloric acid solution and said gaseous alkane is selected from the group consisting of methane, ethane, propane, butane and pentane.

14. The process of claim 13 wherein said alkane is ethane.

15. The process of claim 14 wherein said alkali halide crystal is a sodium chloride crystal.

16. A process for rendering an alkali halide crystal moisture resistant comprising the steps of:

(a) mechanically polishing the surface of said crystal;

(b) chemically etching said surface by dipping said crystal into an aqueous solution of hydrochloric acid;

(c) causing the etching action of said hydrochloric acid solution to cease by dipping said crystal in an alcohol whose structure is $C_nH_{2n+1}OH$ where n is greater than 1 and less than 4;

(d) removing said alcohol by causing a flow of air to impinge upon said crystal and subsequently placing said crystal in a plasma reactor;

(e) evacuating said reactor and subsequently causing a potentially reactive atmosphere to be created by introducing a chlorofluorocarbon gas into said reactor at a preselected flow rate and pressure;

(f) creating a first plasma and causing the molecules of said reactive gases to be bombarded by electrons within said plasma to create nascent halogen anions which displace hydroxyl anions thereby passivating the surface of said crystals;

(g) terminating said first plasma and evacuating said reactor to remove said chlorofluorocarbon gas;

(h) causing an alkane gas to be introduced into said reactor at a preselected flow rate and pressure;

(i) creating a second plasma in said reactor thereby causing said alkane gas to polymerize and deposit onto the surface of said crystal;

(j) terminating said second plasma, evacuating said system and introducting an alkene gas into said reactor to create a quenching atmosphere; and (k) removing said coated crystal from said reactor after said crystal has been alowed to stand in said alkane gas overnight.

17. A process for applying a protective coating to an alkali halide crystal comprising the steps of:

(a) first providing a preconditioned crystal of an alkali halide:

(b) removing hydroxyl anions and other contaminants from said crystal, to provide passivated surfaces on said crystal, by exposing said crystal to nascent halogens in a controlled plasma environment; and (c) immediatedly thereafter causing a plasma-polymerized short chain saturated hydrocarbon film to be deposited in situ onto said passivated surfaces thereby providing a film coated alkali halide crystal which exhibits excellent resistance to high humidity environments and excellent transmissivity to 8–12 mm wavelength radiation.

18. The process of claim 17 wherein said surfaces are passivated by causing a chlorofluorocarbon gas to dissociated in said plasma environment.

19. The process of claim 17 wherein said hydrocarbon film is formed from the molecules of an alkane monomer.

20. The process of claim 18 wherein said hydrocarbon is ethane.

* * * * *